United States Patent

[11] 3,609,061

| | | | |
|---|---|---|---|
| [72] | Inventor | Jerry A. Peoples<br>2419 Greenhill Drive N.W., Huntsville, Ala. 35810 | |
| [21] | Appl. No. | 789,543 | |
| [22] | Filed | Jan. 7, 1969 | |
| [45] | Patented | Sept. 28, 1971 | |

[54] AUTOMATIC LIQUID LEVEL CONTROL SYSTEM
7 Claims, 3 Drawing Figs.

[52] U.S. Cl. .................................................. 417/36,
417/211.5, 417/401
[51] Int. Cl. ...................................................... F04b 49/00,
F04b 35/00
[50] Field of Search ........................................... 122/451;
103/11, 50, 6; 137/394, 96; 417/36, 211.5, 401

[56] References Cited
UNITED STATES PATENTS

| | | | |
|---|---|---|---|
| 2,552,777 | 5/1951 | French .......................... | 103/50 X |
| 2,679,831 | 6/1954 | Henkel .......................... | 122/451 |
| 3,053,435 | 9/1962 | Sanders et al. ................. | 103/6 |
| 3,363,570 | 1/1968 | Scott ............................. | 103/6 |
| 3,457,865 | 7/1969 | Dunlap .......................... | 137/394 |

Primary Examiner—William L. Freeh
Attorney—C. A. Phillips

ABSTRACT: A reciprocating, gas-driven, direct-acting, pumping system for maintaining a predetermined liquid level in a pressure vessel.

Jerry A. Peoples,
INVENTOR

Jerry A. Peoples,
INVENTOR

AUTOMATIC LIQUID LEVEL CONTROL SYSTEM

This invention relates to pumping systems and particularly to pumping systems for automatically maintaining a predetermined liquid level in a container. One example of application for the invention is in providing and maintaining a prescribed liquid level in a steam generator.

Historically, pumps for steam generators have been of the variable displacement type driven by an auxiliary power take off from an engine powered by the steam generator, or by an electric motor. In one such system, water level is maintained by means of a pump bypass which in turn is actuated by a pressure sensitive sequence valve in combination with a temperature expansion rod. Other systems employ bellows-type pressure-force balance arrangements. While previously known systems have proven generally satisfactory, they are nonfunctional during boiler start up and/or cause excess power drain on power sources, particularly on batteries. One common difficulty has been the tendency for sensing components to stick, resulting in ineffective water level control. Another difficulty has been that prior systems have employed one or more dynamic seals, sealing the working system from the atmosphere and such seals are subject to leakage, particularly if vapor is present, with a resulting loss of fluid from the system. Such losses must be made up by the addition of liquids to the system.

It is an object of this invention to overcome the aforesaid and other difficulties and provide an improved pump and automatic liquid level maintenance system.

It is a further object of this invention to provide a pumping system for automatic liquid level control which achieves zero leakage.

In accordance with this invention a predetermined water level is maintained in a container by means of a steam pump, which is driven by vapor from the boiler, controlled in speed, fast or slow, as a function of water level, being driven fast if water level is below a prescribed level and slow if it is above the level. Pumping action is the controlled as a function of pump speed with the pump providing no output when speed is lower than that rate.

These and other objects, features and advantages of the invention will become more apparent from the following description when considered together with the drawings, in which.

Figure 1:
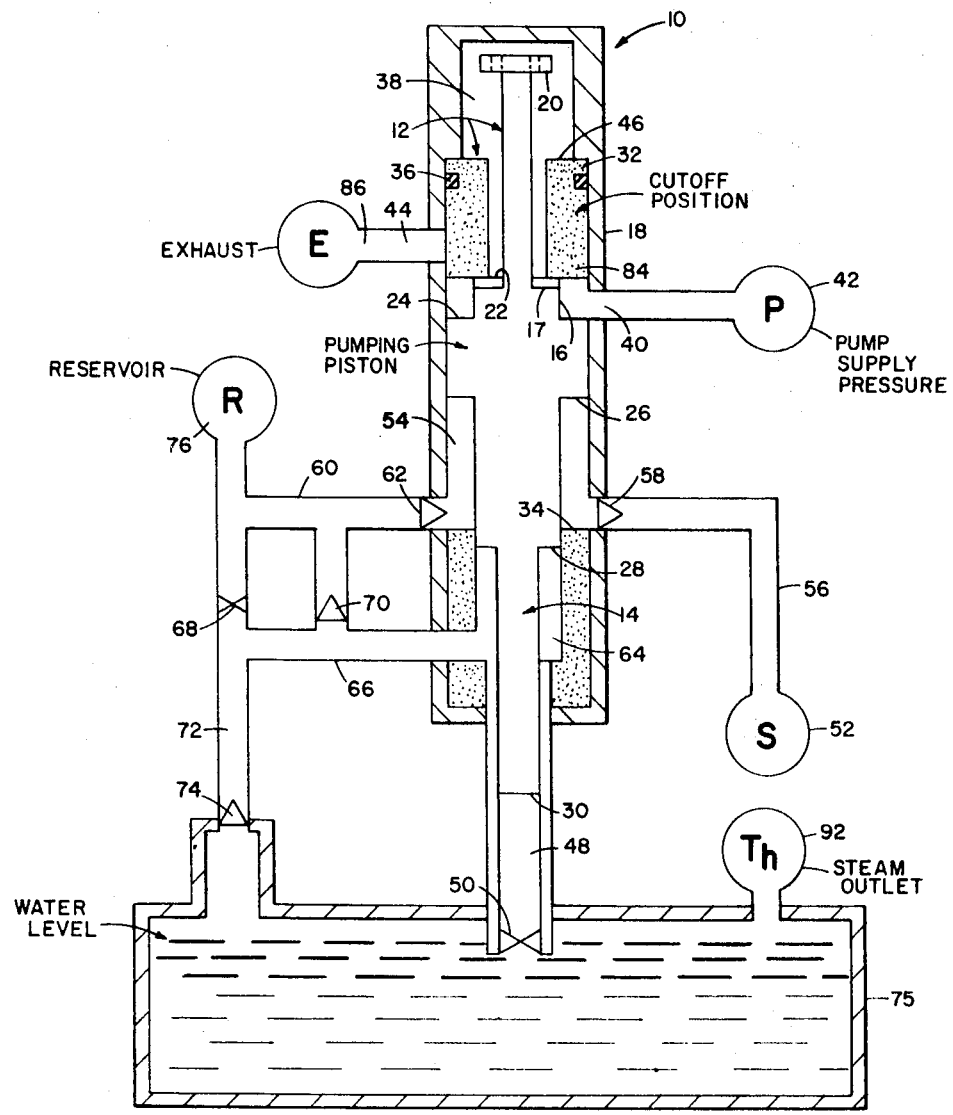
FIG. 1 is a diagrammatic illustration of a pumping system and liquid level control as contemplated by the present invention.

Referring now to the drawings, the engine, pump and control function of this invention are uniquely integrated. However, for purposes of illustration and discussion they are separated into engine or power operation and pumping operations. The system apart from steam or steam engine system as a whole is illustrated in FIG. 1. The top portion of pump assembly 10 contains engine 12, and the bottom portion contains water pump and the elements of the pumping operation. A single piston 16, which serves as an interface between engine 12 and pump 14 slides within housing 18. Piston 16 has six faces, whose purposes will become clear as the description of the invention proceeds. From the top of the piston these faces are designated as faces 20, 22, 24, 26, 28, and 30. These faces move in unison as piston 16 takes different positions within housing 18. Near the top of piston 16 is a second piston, cut off piston 32. Cutoff piston 32 is a primary component of the engine and also slides within housing 18. The upward motion of piston 16 is limited by face 22 of piston 16 engaging cutoff piston 32 at the top of its stroke and its downward motion is limited by boss 34 on housing 18. In the position shown, face 22 of piston 16 is in contact with the bottom face of cutoff piston 32. Whenever piston 16 moves downward, the cutoff piston is also free to move downward. Cutoff piston 32 is initially retained in its position by friction ring 36. Actual movement of cutoff piston 32 is a forced operation resulting from contact of face 20 or 22 of piston 16 with the top or bottom of cutoff piston 32. The volume 38 above and around the top of piston 16 and cutoff piston 32 is available for expansion of steam. Steam enters through port 40 from supply 42. Port 40 communicates with volume 38 by way of grooves 17 in face 32 of piston 16. Exhaust steam from the power operation exits through port 44, after cutoff piston 32 moves past port 44. Movement of cutoff piston 32 is actuated by the downward movement of piston 16 when face 20 of piston 16 contacts the top face 46 of cutoff piston 32.

The bottom end of piston 16, the pumping portion, or face 30, slides in tube 48 which will be referred to as orifice tube 48. At the bottom of the orifice tube 48 is orifice 50. This orifice is located at the desired water level. A sump 52, communicates with volume 54 through channel 56 and check valve 58. Volume 54 also communicates with channel 60 through check valve 62.

Volume 64 communicates with channel 66. Channels 60 and 66 can communicate through orifice 68 or check valve 70. At the bottom of channel 72 is check valve 74 which leads into the high-pressure side of boiler 75. A reservoir 76 is located in channel 60 for purposes which will be explained below.

Channels 72, 60 and 66 are illustrated as being external to housing 18. These are shown externally for purposes of clarity only. They are normally integrated within housing 18. Only reservoir 76 and channel 72 are located external to the pump.

Considering now operation and to the pumping operation, assume that piston 16 has just moved upward to its top position as shown. In doing so a practical vacuum is created as shown in volume 54. This vacuum will upset check valve 58 causing volume 54 to be filled with water from sump 52. The upward stroke causes check valve 62 to seat. Also, the upward motion of piston 16 will create a partial vacuum in channel 66. This vacuum is relieved by the unseating of check valve 70, allowing channel 66 and volume 64 to fill with water from reservoir 76. Some leakage also occurs through orifice 68. Next, during the downward stroke of piston 16 two events take place. First, the water trapped in volume 54 will be forced through check valve 62 toward reservoir 76. Reservoir 76 if vented (by means not shown) to the atmosphere, thus, the pressure in channel 60 is no greater than the cracking pressure of check valve 62. In operation, channels 60 and 66 are always full of water. The operation of the two check valves 62 and 70 allow water to flow from volume 54 through check valve 62 to reservoir 76 and back through check valve 70 into channel 66. On the upward stroke water flows from reservoir 76 and on the downward stroke it flows into reservoir 76. Second water in volume 64 is forced into channels 66 and 72. During the downward stroke, the pressure in channel 66 is greater than that in channel 60, since channel 60 is vented. If the velocity and force of piston 16 is sufficiently great to create a force in channel 66 greater than the supply pressure, check valve 74 will unseat and water will be forced through channel 72 into boiler 75. At the same time, a small portion of water is forced through orifice 68 into the reservoir. The dimensions of surface areas of face 28 and 24 of piston 16 and of orifice 68 are such that the potential exists for creating a pressure in channel 66 greater than boiler pressure. In the event that the velocity and force n piston 16 is not sufficiently large to crack check valve 74, all of the water will leak through orifice 68 into reservoir 76. On every stroke of piston 16 water is forced into the boiler or reservoir depending upon the velocity (force) of the piston. The function of orifice tube 48 and orifice 50 is for the purpose of curtailing the velocity so that the water will be forced into the boiler or reservoir as desired. Curtailment of the velocity of piston 16 does not alleviate the force acting downward on the piston. Curtailment is initiated by creating a retarding force on the piston of sufficient magnitude such that the sum total force acting on the pumping piston 16 is insufficient to accelerate the piston to a velocity sufficient to overcome the leakage through orifice 68 and thus result in a hydrodynamic pressure less than boiler pressure.

If the boiler water level is at level D—D and covers the opening of orifice 50, water will also be drawn into the orifice tube, as the pumping piston 16 moves upward. If the water level is below the orifice, steam will be drawn into the tube. On the downward stroke, the steam or water will be forced out. However, if water is in the orifice tube, a longer time will be required for the piston 16 to complete its stroke, because of the density difference between water and steam. The ratio of the velocity of piston 16 with steam in the orifice tube is proportional to the square root of the density ratio. For typical pressures between 600–1000 p.s.i.a. this ratio is on the order of 10. If the area of orifice 50 is sized properly in relation to orifice 68, a curtailment of the velocity of the pumping piston by a factor of 10 is sufficient to limit hydraulic pressure in channel 66 to that below boiler pressure, or to allow the hydraulic pressure to exceed boiler pressure. Thus, if the water level is above orifice 50, the water in volume 64 is recirculated to the reservoir. If the water level is below orifice 50 the pump will pump at its maximum rate until the level is raised sufficiently to cover orifice 50.

Figure 3:
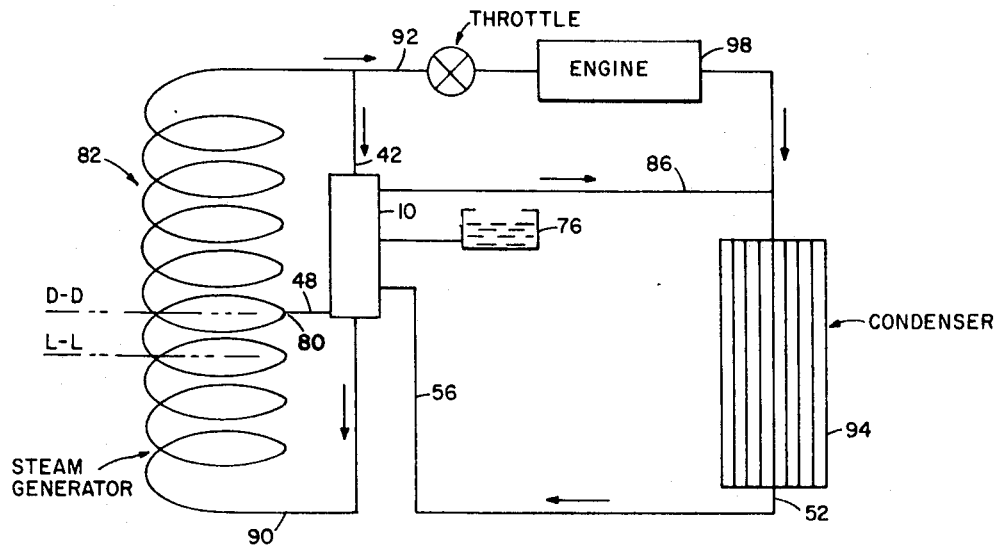
FIG. 3 is a diagrammatic illustration of the sequence of operation of the engine drive portion of the systems illustrated in FIGS. 1 and 2.

It is noted that the interference between the saturated water and saturated vapor because of boiling is quite vigorous. For this reason the water level is sensed through an extension 80 to the main boiler coils 82, as shown in FIG. 3. This provides for a better defined water level. The system is extremely effective in achieving automatic shutdown of the pump in action and a gross curtailment of the pumping piston rate. All of the water is recirculated through the reservoir when the water level rises above the orifice 50. Operation of this pump requires certain relationships between the areas of the pump bounded by volumes 38, 26, 28, the orifice tube diameter and orifices 68 and 50. This relation will be discussed in greater detail following the description of the engine portion of the system.

Figure 2:
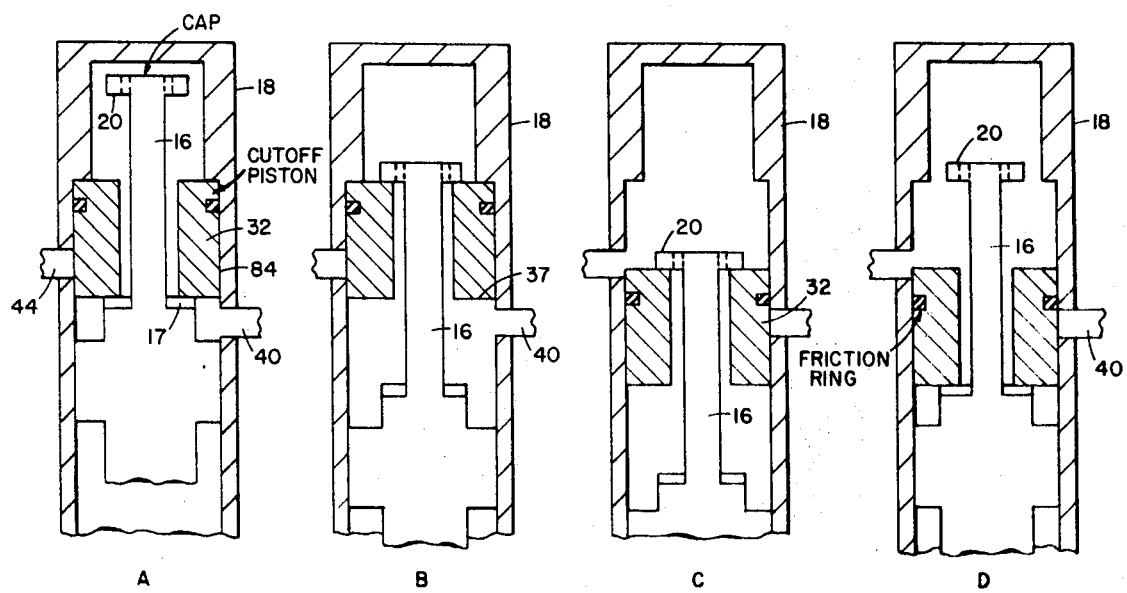
FIG. 2 is a diagrammatic illustration of a complete steam engine system as contemplated by the present invention.

The power operation is illustrated in the sequence of events of FIG. 2. Only that portion of pump assembly 10 applicable to the engine or power operation is shown. The purpose of the power operation is to force piston 16 into a reciprocating motion. In the position shown in FIG. 2A, piston 16 has just completed its upward stroke. Contact exists between the face 22 of piston 16 and the bottom of cutoff piston 32. This contact does not serve as a seal and will leak steam through grooves 17 to the upper part of housing 18 to volume 38. Steam enters through port 40, through the contact area 17 and into volume 38. Piston 16 is then forced downward until the face 20 of piston 16 contacts cut off piston 32. At this point piston 16 is moved to the position shown in FIG. 2B. During this portion of the stroke, steam continues to expand and fill volume 38. Further movement of piston 16 forces cutoff piston 32 to move concurrently. As the steam expands in volume 38, cutoff piston 32 moves surface 84 of cutoff piston 32 past port 40. In doing so, communication between port 40 and volume 38 is interrupted. This action is called cutoff, and implies that the supply steam is cutoff. At cutoff, the trapped gasses continue to expand, both cutoff piston 32 aNd piston 16 are forced downward. Near the bottom of the stroke, the top surface of cutoff piston 32 moves past port 44, establishing communication between the exhaust passage 86 and volume 38 as shown in FIG. 2C.

It is to be noted that at cutoff, and as the gasses expand the pressure decreases in volume 38. It is therefore, necessary to size and arrange the several areas so that the function of the power operation can be maintained even at lowest pressure in volume 38. The relationships become less critical with increased percent cutoff there being less variations in pressure driving the pumping piston. Studies have indicated that a cutoff of 50 percent presents no critical design problems.

In order for the above sequence to take place certain relationships are necessary between the several orifices and pressure areas. The limiting condition for operation is determined by the following relationship.

The formula is as follows:

$$\left\{\left[\frac{A_{68}}{A_{50}}\right]^2 \left[\frac{A_{30}}{A_{28}}\right]^2 + \frac{A_{28}}{A_{30}}\right\} > \left[\frac{A_{24}}{A_{30}} - 1\right]$$

Where:

$A_{68}$ is equal to the area of orifice 68.

$A_{50}$ is equal to the area of orifice 50.

$A_{30}$ is equal to the area of piston 30.

$A_{28}$ is equal to the effective area of annular piston surface 28.

$A_{24}$ is equal to the effective area of annular piston 24.

The return or upward stroke of piston 16 occurs when pressure is relieved in volume 38 and boiler pressure acting in orifice tube 48 forces piston 16 upward. However, if the water is at or covers orifice 50, then as piston 16 is forced upward orifice tube 48 must necessarily fill with water. Thus, the upward motion of piston 16 is curtailed by a factor of 10 over that of the previous case. This is an inherent advantage in that once the desired water level is obtained pump action becomes retarded on the upward stroke. Similarly when water is above orifice 50, the downward stroke is retarded as water must be forced downward through the orifice to complete the stroke. The actuation intervals are thus greatly lengthened. When actuation does occur the velocity curtailment of piston 16 forces water into reservoir 76 rather than into boiler 75.

Exhaust port 44 remains open as piston 16 begins to return (rise). It will remain open until piston 16 travels a distance equal to the original cutoff value. At this point, surface 22 of piston 16 reestablishes contact with the bottom of cutoff piston 32. This position is illustrated in FIG. 2D. The pressure in the orifice tube then forces piston 16 and cutoff piston 32 upward to the position shown in FIG. 2A. When cutoff piston 32 is raised sufficiently to reestablish communication between volume 38 and port 40, the entire action is repeated.

Referring to FIGS. 1 and 3, assume that the water level is at L—L. The desired water level is illustrated at D—D, the location of orifice 50. Assume that piston 16 as just completed its pumping stroke and exhaust gasses expelled. Boiler pressure acts on area 30 of piston 16 and it begins its upward stroke. As piston 16 is forced upward check valves 58 and 70 are unseated as a result of the partial vacuum created in volumes 54 and 64. Further movement of piston 16 causes water from sump 52 to be drawn through channel 56 into volume 54 and volume 64 is filled with water from reservoir 76. Piston 16 moves up quickly since steam is in the orifice tube. Finally surface 22 of piston 16 contacts the lower surface of cutoff piston 32 and they both move up together as illustrated in FIG. 2D. As piston 16 continues to move upward the communication between exhaust port 44 and volume 38 is interrupted by cutoff piston 32. Finally cutoff piston 32 is pushed upward sufficiently that intake port 40 is uncovered. Volume 38 quickly pressurizes from steam being ported through port 40 from supply source 42. At this point volumes 54 and 64 are completely full of water. The supply channel 42, which ports steam into volume 38, is also common with channel 92 which ports steam from the generator through the throttle into the engine 98. The exhaust of the engine is channeled into the condenser 94.

The force now acting on top of piston 16 is much greater than the force caused by the pressure in the orifice tube. As a result piston 16 moves downward, check valve 62 unseats and valves 58 and 70 seat. The water in volume 54 is forced through check valve 62 into reservoir 76. In volume 64 the hydrodynamic pressure becomes greater than boiler pressure since the steam through orifice 50 offers little resistance to the downward velocity of piston 16. As the pressure in channel 66 exceeds boiler pressure, check valve 74 will be unseated, and thus water will be forced into the boiler 75. This action occurs rather quickly and very little water is returned to reservoir 76 through orifice 68.

As piston 16 reaches 50 percent of its stroke face 20 of piston 16 makes contact with the top of cutoff piston 32. At this point, piston 16 pulls the cutoff piston past port 40, completely interrupting communications between port 40 and volume 38. The steam trapped in volume 38 continues to expand, driving piston 16 through its stroke. Near the bottom of the stroke, as shown in FIG. 32, piston 16 pulls cutoff piston 32 past port 44. The pressure in volume 38 is reduced to the point that boiler pressure within orifice tube 48 is great enough to force the piston 16 upward. The exhaust from channel 86 is ported into the condenser 94. The cycle is then repeated until the level at L—L rises to D—D at which time, during an upward stroke of piston 16, water will be drawn into orifice tube 48. As stated above, the velocity of the downward stroke is reduced by a factor of ten as a result of a much greater density medium in the orifice tube. The curtailed velocity of the pumping piston is reduced sufficiently that the leakage through orifice 68 is great enough to prevent a hydrodynamic pressure greater than boiler pressure. As a result, all of the water in volume 64 leaks through orifice 68 into reservoir 76. Reservoir 76 is equipped with an overflow which leads to the sump by means not shown. This prevents the reservoir from over filling from a prolong static state of the boiler.

The invention having thus been described, I claim:

1. An automatic liquid level control system comprising:
    A. A container in which liquid is to be maintained at a predetermined level;
    B. A pump connected to pump liquid to said container;
    C. An engine coupled to and driving said pump;
    D. Engine speed control means responsive to a level of liquid above said predetermined level for retarding the speeds of said engine; and
    E. Flow control means responsive to the rate of flow from said pump for coupling flow from the output of the said pump to said container when said pump is not retarded in speed by said engine control means and preventing flow from said pump to said container when the speed of said engine is retarded by said engine speed control means.

2. An automatic liquid lever control system as set forth in claim 1 wherein said engine and engine speed control means comprises a reciprocating engine having first and second opposed operating cylinder assemblies and wherein:
    A. Said first cylinder assembly including a first piston and first valve means for applying pressure to said first piston to drive said first piston in a first direction from a first end of its stroke and to the opposite end of its stroke and including means for releasing said pressure at said opposite ends of its stroke; and
    B. Said second cylinder assembly including a second piston and second valve means responsive to the liquid level in said container for applying a fluid force to said second piston which fluid force has a substantial inertia when the liquid level in said container is above said predetermined level and slight inertia when said liquid level in said container is lower than said predetermined level.

3. An automatic liquid level control system as set forth in claim 2 wherein said valve control means of said second cylinder assembly comprises an orifice interconnecting said second cylinder assembly with the interior of said container said container is under pressure and said orifice is positioned at said predetermined level where when said level rises above said orifice the fluid pressure acting on said system of said second cylinder assembly is in the form of liquid which moves relatively slow through said orifice and moves said piston of said second cylinder assembly relatively slow and wherein when said level is below said orifice the fluid force acting on said piston of said second cylinder assembly is in the form of gas which moves rapidly through said orifice and causes said piston of said second cylinder assembly to move rapidly.

4. An automatic liquid level control system as set forth in claim 3 further comprising:
    A. Said pump comprising third and fourth cylinder assemblies having respectively, third and fourth pistons acting together;
    B. First and second channels;
    C. A first check valve for permitting unilateral flow from said third cylinder assembly to said first channel, said fourth cylinder assembly being connected to said second channel;
    D. A second check valve for permitting unilateral flow from said first channel to said second channel;
    E. An orifice connecting and permitting restricted bilateral flow between said first and second channels;
    F. A reservoir connected to said first channel; and
    G. A third check valve for permitting unilateral flow from said said second channel to said container when the fluid pressure in said second channel exceeds the pressure in said container; whereby, fluid is drawn into said fourth cylinder assembly during the expansion stroke of said fourth piston and is selectively forced from said fourth to either said reservoir or to said container depending, respectively, whether said pump is retarded in speed or not retarded in speed.

5. An automatic liquid level control system as set forth in claim 4 wherein said first valve means comprises:
    A. A pressure inlet into said first cylinder assembly;
    B. An exhaust exit from said first cylinder assembly; and
    C. A sleeve piston positioned within said first cylinder assembly and operated in a first direction by said first piston during a last portion of the stroke of said piston in said first direction and operated in the opposite direction during a last portion of the stroke of said first piston in said opposite direction whereby said sleeve alternatively opens and closes said pressure inlet and said exhaust outlet to achieve in combination with force applied to said second piston reciprocating motion of said engine and said pump.

6. An automatic liquid level control system as set forth in claim 5 wherein said second valve means comprises an orifice interconnecting said second cylinder assembly and the liquid level in said container and said orifice is positioned at said predetermined level whereby the displacement of said second piston is retarded in speed when said liquid level is above and thus immerses said orifice and the speed of said second piston is not retarded when the liquid level is below and does not immerse said orifice.

7. An automatic liquid level control system as set forth in claim 6 wherein said first, third, fourth and second pistons are coupled together and positioned in line in the order named and act in unison within a single chamber comprising said first, third, fourth and second cylinder assemblies.